United States Patent [19]

Buck et al.

[11] Patent Number: 4,515,125
[45] Date of Patent: May 7, 1985

[54] SAFETY ARRANGEMENT FOR AN INTERNAL COMBUSTION ENGINE

[75] Inventors: Rainer Buck, Tamm; Hermann Kull, Stuttgart; Fridolin Piwonka, Tamm; Albrecht Sieber, Ludwigsburg; Gerhard Stumpp, Stuttgart; Wolf Wessel, Oberriexingen, all of Fed. Rep. of Germany

[73] Assignee: Robert Bosch GmbH, Stuttgart, Fed. Rep. of Germany

[21] Appl. No.: 571,477

[22] Filed: Jan. 17, 1984

[30] Foreign Application Priority Data

Jan. 20, 1983 [DE] Fed. Rep. of Germany ....... 3301742

[51] Int. Cl.³ .............................................. F02D 31/00
[52] U.S. Cl. .............................. 123/359; 123/198 DB
[58] Field of Search ........ 123/359, 357, 358, 198 DB, 123/198 D, 325

[56] References Cited

U.S. PATENT DOCUMENTS

| | | | |
|---|---|---|---|
| 3,699,935 | 10/1972 | Adler et al. | 123/358 |
| 3,973,539 | 8/1976 | Jones et al. | 123/359 |
| 4,357,920 | 11/1982 | Stumpp et al. | 123/358 |
| 4,428,341 | 1/1984 | Hassler et al. | 123/359 |

FOREIGN PATENT DOCUMENTS

3130094 2/1983 Fed. Rep. of Germany ...... 123/359
210133 12/1982 Japan ................................ 123/359

Primary Examiner—Magdalen Y. C. Moy
Attorney, Agent, or Firm—Walter Ottesen

[57] ABSTRACT

The invention is directed to a safety arrangement for an internal combustion engine having self-ignition where, in the sense of an overall system monitoring, specific signals relating to the operating conditions of the internal combustion engine are continuously monitored. These signals are indicative, for example, of the position of the throttle pedal, the computed rack-travel nominal or desired value, and the rotational speed. The monitored signals are processed and a corrected rack-travel nominal value is generated by means of a minimum-value selection circuit. The corrected rack-travel nominal value signal generated in this manner is fed to the rack controller of an EDC unit. At the same time, a deviation in rack travel is determined utilizing the corrected rack travel nominal value in combination with an actual-value signal of the rack travel fed back from the rack-travel sensor. The signal indicative of actual rack travel also serves for a comparison with the upper and lower limits of the rack-travel sensor voltage; and, depending on the error condition occurring, either the output stage of the rack controller is de-energized and-/or the fuel-injection pump is simultaneously shut off by means of an electrical shutoff valve (ELAB); or, a decision for an emergency operation is made.

10 Claims, 5 Drawing Figures

SAFETY ARRANGEMENT FOR AN INTERNAL COMBUSTION ENGINE

FIELD OF THE INVENTION

This invention relates to a safety arrangement for an internal combustion engine having self-ignition.

BACKGROUND OF THE INVENTION

For electronic control of the operation of self-igniting internal combustion engines (diesel engines), it is known to utilize electric actuators activated by electric signals, with a central control unit being substituted for mechanical fuel-metering and regulating systems to generate the necessary control signals. While mechanical fuel-metering systems for diesel engines are to be considered reliable regarding their fail-safe operation, they are progressively less in a position to make allowance for the many different operating and environmental conditions.

The use of electronic components in combination with electronic diesel control (EDC) makes comprehensive safety and monitoring measures desirable even in cases where the individual assemblies themselves already afford error-detecting capabilities.

SUMMARY OF THE INVENTION

In view of the above, it is an object of the invention to provide a safety arrangement for total monitoring of EDC units for diesel engines during operation. The arrangement senses permissible and impermissible ranges of operation by means of suitable signals and, depending on the nature of the error detected, shuts off the diesel engine or allows an emergency mode of operation in a desirable manner.

The safety arrangement according to the invention provides an overall monitoring of the system for an EDC unit which ensures that the failure of individual components will not cause a hazardous situation for the engine, the vehicle or its operator. Any error condition occurring as a result of the failure of specific components with the diesel engine in operation either causes the engine to be shut off automatically or, alternatively, in the event of other failures which do not render the vehicle inoperative and are considered permissible, operation can be switched over to an emergency mode.

In addition to determining whether a maximum speed $N_{max}$ is exceeded (overspeed protection), the arrangement also determines whether a specific limit speed $N_{lim}$ is exceeded which, for instance, may be 40% above the no-load or idle speed. In this case, a logic operation will be performed with either the brake actuation signal or the throttle pedal no-load position signal, such that for speeds greater than the limit speed $N_{lim}$, a minimum rack travel (to guarantee zero delivery of fuel) is always set, irrespective of the nominal or desired value for rack travel which the processor supplies for this particular instant of operation. This measure does not affect normal operation; however, in the event of malfunction, the vehicle operator is in a position to set the zero delivery via the regular controls.

The invention advantageously makes use of signals such as brake and zero throttle pedal position which are existing and have to be generated anyway and ensures that in the two operating modes of braking and no-load (idle), no fuel is supplied to the engine when a specific engine speed is exceeded.

BRIEF DESCRIPTION OF THE DRAWING

The invention will now be described with reference to the drawing wherein.

DESCRIPITON OF THE PREFERRED EMBODIMENTS OF THE INVENTION

The basic concept of the invention is to provide a minimum rack travel in the event of malfunction based on specific operating condition signals. The rack travel corresponds to the fuel quantity supplied (injected into) to the internal combustion engine. This minimum rack travel is a newly corrected nominal or desired value of the rack travel and is used for further processing in a decision logic circuit which takes into consideration supplementary peripheral conditions and decides on whether an automatic (reversible) shutdown of the engine is to occur or whether a switch over to an emergency mode of operation can be made.

Figure 1:
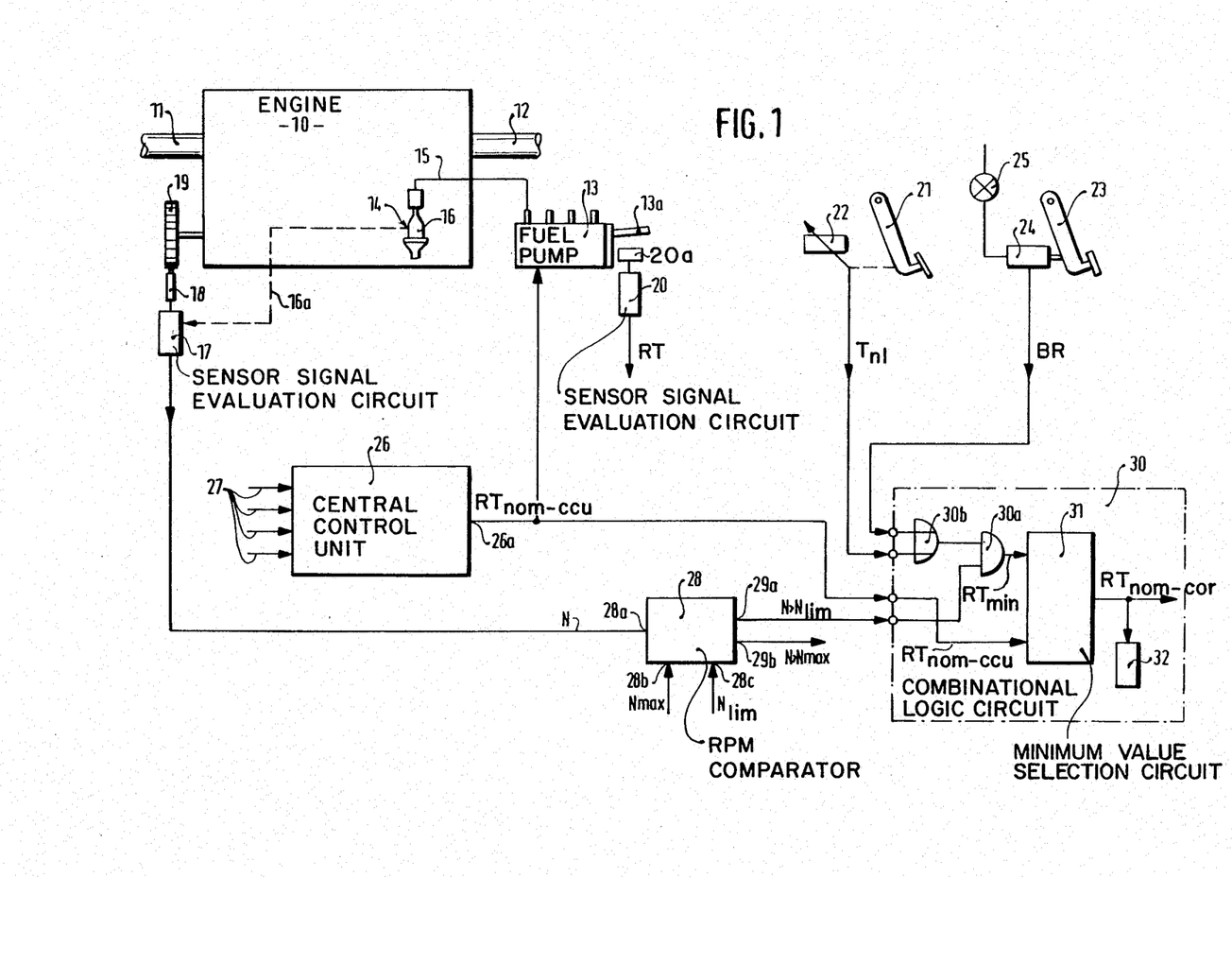
FIG. 1 is a schematic representation of an internal combustion engine and the safety arrangement of the invention associated therewith in the form of a block diagram and includes the essential sensors as they are used for implementing the invention for overall system monitoring.

Referring now to FIG. 1, the internal combustion engine is a diesel engine and is identified by reference numeral 10; it includes an inlet manifold 11 and an exhaust manifold 12. A fuel pump 13 communicates with an injection valve 14 via a pressure conduit 15. The injection valve 14 can include an injection-begin sensor 16 which provides a redundant rotational speed signal to a sensor signal evaluation circuit 17 via a data path 16a.

To obtain the signal indicative of rotational speed (rpm), an rpm sensor 18 is provided which senses the rotational speed of the internal combustion engine via a spur gear 19 driven by the engine crankshaft and which has an output connected to the sensor signal evaluation circuit 17.

It is to be understood that the manner in which the signals are obtained for the safety arrangement of the invention as shown in FIG. 1 is only by way of example; the individual signals used may be derived from the operating conditions of the internal combustion engine also in other ways. It is important to note further that the signal-processing function to be explained in more detail in the following may also be achieved in a number of different ways and using circuit configurations other than the ones described below as discrete components. The signal processing can be performed by a central control logic circuit or microcomputers including microprocessors and the like.

Supplementary to the actual speed signal N present at the output of the sensor signal evaluation circuit 17, the following additional signals are of importance in implementing the safety arrangement according to the invention: an actual-value signal RT indicative of the actual rack travel which is obtained from the position of the control rod 13a of the fuel pump 13, for example, via rack travel sensor or position transducer 20a; and a signal indicative of the throttle-pedal position which in this particular application is a signal $T_{n1}$ corresponding to the no-load (idle) position and may be derived, for example, from a tap of a potentiometer 22 mechanically connected with the throttle pedal 21, but may also be obtained from a no-load contact switch provided at the throttle pedal. Finally, the generation and evaluation of a brake signal BR is provided which may be generated by the brake pedal 23 via a suitable contact sensor 24 which is also adapted to operate the stop lights or is a separate device. In the usual situation, the brake contact sensor can be part of a pressure switch arranged in the brake cylinder.

For the electronic control of the fuel injection pump 13, a central control unit 26 including a processor is provided to which a plurality of outside operating signals, environmental signals and reference quantities can be applied at inputs indicated by reference numeral 27. The control unit 26 uses these input quantities together with actual-value feedback signals to generate a nominal or desired value for the rack travel $RT_{nom-ccu}$. This signal $RT_{nom-ccu}$ is fed to the fuel-injection pump 13 and is the nominal or desired value of the rack travel as computed by the electronic control unit 26.

FIG. 1 also shows a comparator 28 to which is supplied the actual value N of the rotational speed of the internal combustion engine at input 28a and, to its further inputs 28b and 28c, are applied comparison values $N_{max}$ and $N_{lim}$, respectively. $N_{max}$ is the maximum permissible rotational speed of the internal combustion engine and, $N_{lim}$ is a specified minimum rotational speed or limit rotational speed, and is selected in accordance with the no-load speed. The comparator 28 will then produce at its outputs 29a and 29b respective comparison signals $(N>N_{lim})$ if the actual speed N has exceeded the predetermined minimum or limit speed $N_{lim}$, and $(N>N_{max})$ if the actual speed N has exceeded the maximum permissible speed for this internal combustion engine.

In addition, FIG. 1 illustrates a signal preprocessing or combinational logic circuit 30 which combines the operating signal indicative of the throttle pedal no-load position $T_{n1}$ and the brake signal BR with the computed nominal or desired value $RT_{nom-ccu}$ of the rack travel and the comparison signal $(N>N_{lim})$.

The further configuration of the safety arrangement of the invention including the circuits shown in the other FIGS. is described below in conjunction with an explanation of the operation thereof.

The safety arrangement of the invention is essentially configured to respond when an EDC controlled fuel injection system for a diesel engine increases the quantity of fuel injected in an uncontrolled manner and when such injection is not wanted by the operator of the motor vehicle.

Such an unwanted opening of the throttle might occur under the following conditions:

(a) when the throttle pedal 21 is defective, that is, although the operator of the vehicle does not step on the throttle pedal, the throttle pedal nonetheless signals a requirement for a large quantity of fuel to the EDC control unit 26 (such a connecting line is not shown in FIG. 1); this action could occur, for example, if a signal issues from the potentiometer 22 driven by the throttle pedal; and, (b) signal processing in the central control unit 26 is defective, in particular, in the processor thereof which then presets an incorrect value $RT_{nom-ccu}$ for the rack travel of the fuel-injection pump 13.

Condition (b) will be considered first in which an undesirable high quantity of fuel is injected due to a failure in the area of the control unit 26 itself or its input/output peripherals. For this condition (b), it may be assumed that the vehicle operator's first reaction will be to release the throttle pedal so that it assumes a no-load position. It is then necessary to ensure that above a minimum speed or limit speed $N_{lim}$, no further injections of fuel take place in the above-described condition. As was noted above, the speed $N_{lim}$ is determined by the applicable idle speed and lies above the same.

For this condition, therefore, a minimum reference value $RT_{min}$ for the rack travel is generated at the output of an AND-Gate 30a of the combinational logic circuit 30 in response to a signal $T_{n1}$ indicative of the throttle pedal no-load position and the speed signal $(N>N_{lim})$. The minimum reference value $RT_{min}$ is fed to a minimum-value selection circuit 31 and is formed to ensure that no fuel is injected at any rotational speed N which is above $N_{lim}$.

The minimum-value selection circuit 31 compares the rack travel quantity $RT_{min}$ thus obtained with the nominal quantity $RT_{nom-ccu}$ provided by the central control unit 26 and transmits the smaller one of these two quantities as a corrected reference value $RT_{nom-cor}$ to a rack controller of the fuel-injection pump 13. The rack controller is represented schematically in FIG. 1 and is identified by reference numeral 32.

If the rotational speed is below the limit speed $N_{lim}$, the injection of a quantity of fuel must be permitted because otherwise the engine idle speed control (performed by the processor) cannot work in normal operation.

This type of minimum-value selection covers the error condition wherein there is a false value of the rack travel signal $RT_{nom-ccu}$ computed in the central control unit.

Regarding condition (a) referred to above wherein the throttle pedal is defective, it is to be assumed that the vehicle operator will apply the brake if fuel continues to be injected (as a result of the incorrect throttle-pedal signal) notwithstanding that the throttle pedal is in the no-load position. The brake signal BR is applied to OR-Gate 30b as is throttle-pedal signal $T_{n1}$ so that an output is always applied to AND-Gate 30a when the brake pedal is actuated.

For the condition (a), the rotational speed N of the engine will be greater than $N_{lim}$ so that the comparison signal $(N>N_{lim})$ will likewise be applied to AND-Gate 30a so that when the brake signal BR is transmitted during this condition (a) in response to a force applied to the brake 23, the minimum reference value $RT_{min}$ will always be generated at the output of AND-Gate 30a which is applied to the input of the minimum-value selection circuit 31.

Therefore, both the application of force to the brake 23 and the positioning of the throttle pedal 21 to the no-load position corresponding to the signals BR and $T_{n1}$, respectively, are here treated in an equivalent manner by an OR logic operation performed in the OR-Gate 30b of the combinational logic circuit 30. If required, it is also possible to obtain the signals BR and $T_{n1}$ from comparators.

Over and above the foregoing, however, it must be determined whether this results in a shutoff of the fuel-injection pump 13 or whether operation can continue in an emergency mode. In this regard, the following conditions apply and the fuel pump has to be shut off if:

(a) the overspeed $N_{max}$ is reached;
(b) the control rod or electric rack actuator in the fuel-injection pump 13 cease to respond to the instructions from the central control unit 26 (possible reasons: control rod jammed, output stage transistor is shorted, cable to the rack actuator disconnected, etc.)

In contrast, fuel pump is not to be shut off if:

(c) only the rack travel feedback is defective (sensor 20a or sensor signal evaluation circuit 20 of FIG. 1 is defective, or if, for example, its cable has become disconnected).

For condition (c), an emergency mode of operation should be attempted via a control of the rack actuator.

Figure 2:
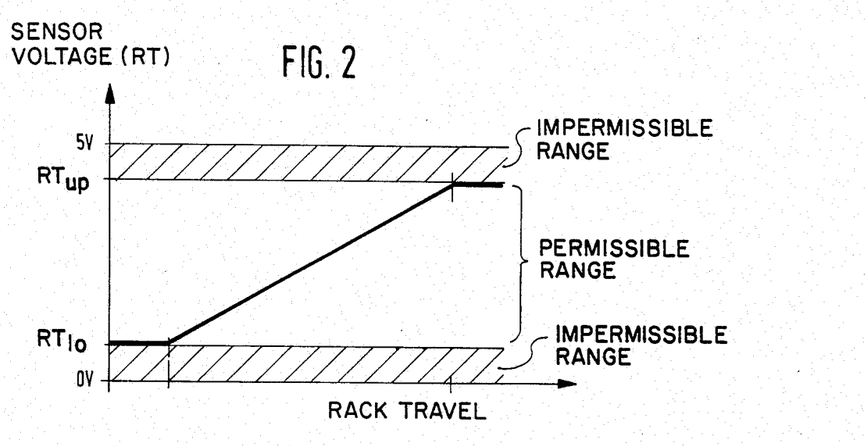
FIG. 2 shows the characteristic curve of the rack travel sensor in the form of rack travel sensor voltage versus rack travel.

To clarify the condition (c) in advance, that is, whether an emergency mode of operation is possible, it is first necessary to address an inquiry as to whether the rack travel feedback signal RT is within the permissible range; a suitable definition is shown by the diagram of FIG. 2 wherein voltages in the form of upper and lower limit values $RT_{up}$, $RT_{lo}$ of the rack travel separate the permissible range from the impermissible ranges of the sensor characteristic. If the sensor output voltage RT for the actual value of the rack travel is above the limit value $RT_{up}$ or below the limit value $RT_{lo}$, then the rack travel is not within the permissible range.

It is important that in the presence of any failure condition in which the rack travel is within the permissible range (i.e., $RT_{lo} > RT > RT_{up}$), an emergency operation must not be allowed and that only the shutoff decision is applicable. The reason for this is that in this case it is not merely the rack travel feedback that is defective but a failure condition is present which precludes an emergency mode of operation. Conversely, an emergency mode of operation may be attempted if the rack travel feedback is not within the permissible range.

Figure 3:
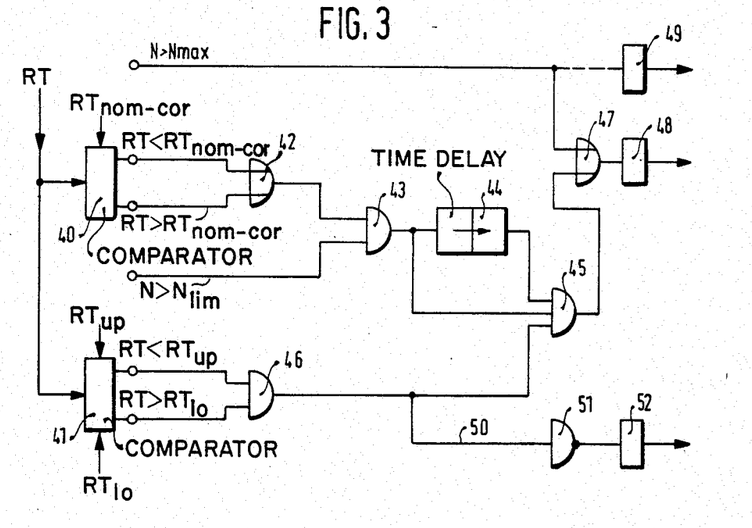
FIG. 3 is a first embodiment of a decision logic circuit in which the decisions on fuel supply shut-off or emergency operation are made.

The decision logic circuit shown in FIG. 3 will make this clear. This decision logic circuit includes a first comparator 40 and a second comparator 41, having respective inputs to which is applied the actual-value rack travel feedback signal RT indicative of rack travel. Comparator 40 determines whether the rack travel is above or below the predetermined nominal value which is preferably the corrected nominal value $RT_{nom-cor}$ from the minimum-value selection circuit 31 of FIG. 1. Any deviation above or below this value results in output comparison signals ($RT < RT_{nom-cor}$) or ($RT > RT_{nom-cor}$) which are fed to a rack travel deviation OR-Gate 42 whereat an OR logic operation is performed thereon and which are then fed to an AND-Gate 43. The AND-Gate 43 determines whether the rack travel deviation ($RT < RT_{nom-cor}$) or ($RT > RT_{nom-cor}$) occurs above the limit speed $N_{lim}$ since the comparison signal ($N > N_{lim}$) is fed to the other input of the AND-Gate 43 and can be transmitted, for example, from the comparator 28 shown in FIG. 1.

A time delay circuit 44 is connected to the output of the AND-Gate 43 and generates a predetermined time delay. The time delay circuit 44 has an output connected to a first input of a further AND-Gate 45. The output signal of the AND-Gate 43 is also fed directly to a second input of AND-Gate 45 and the output signal from an AND-Gate 46 is applied to the third input thereof. The output signal from AND-Gate 46 indicates whether the rack travel is within the permissible rack travel range shown in FIG. 2. Consequently, a signal will be present at the output of the AND-Gate 45: if, at the same time, the following conditions are present: a deviation in rack travel is determined; this deviation in rack travel occurs when the rotational speed is greater than the limit speed ($N > N_{lim}$); these two conditions continue to be present after a predetermined time delay has elapsed; and, the feedback rack travel RT is within the permissible range ($RT_{lo} > RT > RT_{up}$).

In this case, it is via an OR-Gate 47 that both the output stage of the rack controller for controlling the fuel-injection pump 13 is switched off by interrupting the current supply thereto and the injection equipment is shut off by actuating an electrical shut-off valve (ELAB) provided on the pump. For this purpose, a further function block 48 is provided and is activated by the OR-Gate 47.

At this point, it is again noted and becomes apparent from the condition circuits mentioned thus far that such condition logic circuits are particularly suited to microprocessors or similar computers; therefore, the function logic blocks (AND-Gates, OR-Gates, selection logic and the like) are explained herein for a better understanding of the invention and are to be understood as being exemplary.

The limit speed $N_{lim}$ is advantageously included in the function sequence of FIG. 3 in order to disable the time delay under cold starting conditions until the necessary starting speed $N_{lim}$ is attained. In this connection, it is noted that the control rod 13a may follow the nominal or desired value of the rack travel only slowly during cold weather.

Moreover, the OR-Gate 47 will issue the commands for interrupting the current to the output stage and actuating the electrical shut-off valve (ELAB) for shutting off the injection equipment immediately when the comparison signal ($N > N_{max}$) is present which indicates that an overspeed has been determined.

The sequence of functions of FIG. 3 results in an irreversible shut-off. That is, the system is not switched on again after the error condition has been eliminated, for example, after an overspeed condition is no longer present. This effect is desirable for some applications and results from the feedback via the rack-travel deviation as follows: overspeed→current to output stage interrupted→rack-travel deviation→interruption of current to output stage maintained.

In other words, the interruption of current to the output stage results in a rack-travel deviation which automatically causes this output stage to remain de-energized.

If this feedback is to be avoided, a separate final logic circuit 49 is provided, as its sole purpose, to interrupt current to the output stage and is only activated in the presence of the overspeed condition ($N > N_{max}$). This action is represented schematically in FIG. 3 by the broken line leading to function block 49. However, the electrical shut-off valve (ELAB) on the pump continues to be activated both in the presence of an overspeed condition and by the rack-travel deviation in accordance with the conditions explained above. In this case, however, the final function block 48 no longer has the capability to interrupt the current of the output stage of the rack controller.

Electrical shut-off valves (ELAB) on the pump may be configured in a number of different ways; thus ELAB-systems may be used having technical specifications which permit the same to re-enable the injection equipment even at high rotational speeds after having been shut-off by the final function block 48, so that fuel-injection can be resumed, for example, when the normal speed is reached. In the case of fuel-injection pumps, the high rotational speed is mostly associated with a high fuel pressure in the pump suction chamber where the ELAB system is located. Accordingly, the supplementary sequence of functions of FIG. 3 is suitable for ELAB configurations which are adapted to restart even at high rotational speeds.

Figure 4:
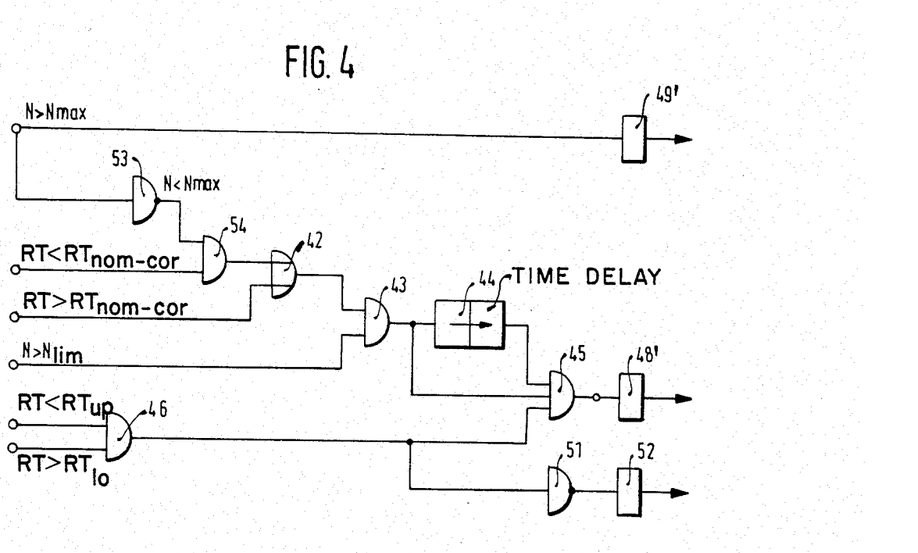
FIG. 4 is another embodiment of a decision logic circuit.

If ELAB configurations are used which do not provide this feature, then the procedure according to the embodiment of FIG. 4 becomes applicable wherein the presence of overspeed ($N > N_{max}$) merely interrupts current to the output stage via logic circuit 49' without, however, affecting the ELAB shut-off capability. This aspect will now be discussed below.

With reference to the decision criteria on whether or not the rack travel RT is within the region bounded by $RT_{up}$ and $RT_{lo}$, there is also a decision branch path 50 provided for an emergency mode of operation as shown in FIG. 3. With this path 50, an emergency operation block 52 is activated via an invertor 51. The emergency circuit 52 allows an emergency operation for all malfunction conditions in which the rack travel is already outside of the permissible range. Therefore, this emergency circuit 52 detects a malfunction condition caused by incorrect feedback of the actual rack-travel signal RT with priority being given over the final function logic circuit 48 which in this case would at least also shut off the ELAB. However, interruption of the output stage of the rack controller via the signal ($N > Nhd$ max) has absolute priority if damage to the engine is to be avoided.

Since in the modified decision logic circuit of FIG. 4 only an overspeed condition interrupts the current to the output stage of the rack controller, it is to be avoided that a rack-travel deviation is detected as a result of the shut-off output stage, in which case the sensed deviation would also shut off the ELAB. The mere interruption of current to the output stage is reversible via the final function logic circuit 49' upon a return of the engine speed to normal.

Accordingly, if the output stage is de-energized in the manner indicated by FIG. 4, then, at the same time, the rack-travel deviation branch ($RT < RT_{nom-cor}$) is inhibited in the presence of an overspeed condition. This is accomplished by feeding the overspeed reference signal ($N > N_{max}$) to an inverter 53 whose inverted output signal ($N < N_{max}$) is then combined with the rack-travel deviation signal ($RT < RT_{nom-cor}$) in an AND-Gate 54. The signal processing then continues from the output of the AND-Gate 54 as already described with reference to FIG. 3. Accordingly, reference numerals corresponding to those used in FIG. 3 are used for the logic components where appropriate. In this embodiment, however, a positive rack-travel deviation ($RT > RT_{nom-cor}$) continues to be sensed as before, enabling, for example, a jammed control rod to be detected when an overspeed condition is present.

Figure 5:
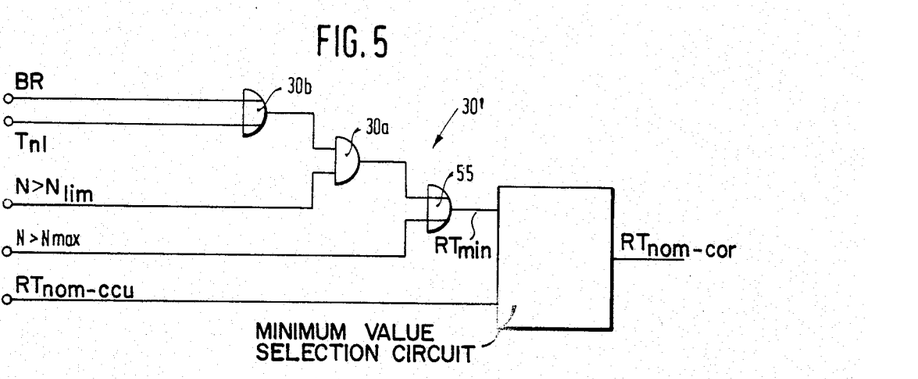
FIG. 5 is a second embodiment of a signal-processing logic which is placed ahead of the decision logic circuits of FIG. 3 or FIG. 4.

The error-detecting function may be improved by the pre-processing logic circuit 30' of FIG. 5 in which like components have functions identical to those of FIG. 1 and are assigned like reference numerals. The embodiment of FIG. 5 provides an additional operation of setting the corrected value of the rack travel $RT_{nom-cor}$ to $RT_{min}$; this is achieved by sensing the overspeed signal ($N > N_{max}$) and applying it to an additional OR-Gate 55. Thus, the logic arrangement of FIG. 5 presets a corrected rack travel value $RT_{nom-cor}$ as $RT_{min}$ in the presence of an overspeed condition, which value signifies a zero quantity of fuel injected, so that the check for positive rack-travel deviation ($RT > RT_{nom-ccu}$) according to FIG. 4 is sufficient to guard against any uncontrolled injections.

In the invention, the following aspects and advantages are of particular significance:

1. Protection against uncontrolled injection is obtained by predetermining a minimum rack travel $RT_{min}$ for zero quantity of injected fuel. In this arrangement, $RT_{min}$ as a corrected rack-travel desired value affords an advantage over a complete de-energization of the output stage of the rack controller by arranging for the control loop to remain closed in normal operation and for the rack controller not to be overdriven which would result in an undesirable regulating action when the throttle pedal is depressed. The rack follower may include an integral regulator.

2. The selection of the minimum value results from the nominal or desired value of the rack travel $RT_{nom-ccu}$ predetermined by the computer itself in combination with the brake-actuation signal BR or the throttle-pedal no-load position signal $T_{n1}$ with the further combination of a minimum rotational speed $N_{lim}$ to ensure no-load control under normal operating conditions.

3. A decision is made for either emergency operation or shutoff, with a reversing capability as may be required.

4. The criterion for the shutoff decision is the rack-travel deviation and this being in combination with a signal indicating that a limit speed $N_{lim}$ and a delay time have been exceeded to ensure a good starting performance.

5. By using a feedback via the rack-travel deviation, it is possible to provide an arrangement for irreversible shutoff.

6. By using an ELAB equipment which again switches in even at high rotational speeds, an arrangement for reversible shutoff is obtained.

7. The reversible shutoff function is also achievable by a suitable circuit configuration (logic circuit of FIG. 4), even if an ELAB configuration is used which cannot switch-in again at high rotational speeds.

8. In the presence of an overspeed condition, it is possible to predetermine $RT_{min}$ in order to ensure a reliable check for rack-travel deviation also in cases where an ELAB configuration is used which cannot switch-in at high rotational speeds.

As indicated in the disclosure, the term "rack travel" is representative of terms such as metered fuel, load of the internal combustion engine, or quantity of fuel delivered and all mean the same, namely: the amount of fuel which the internal combustion engine has consumed to this point in time. The term rack travel therefore corresponds to a specific fuel-quantity signal and can be replaced with other suitable fuel-quantity signals. Accordingly, the term should not be viewed as being limited in this disclosure and in the claims which follow.

It is further understood that the foregoing description is that of the preferred embodiments of the invention and that various changes and modifications may be made thereto without departing from the spirit and scope of the invention as defined in the appended claims.

What is claimed is:

1. A safety arrangement for a self-igniting internal combustion engine such as a diesel engine or the like for a motor vehicle wherein the engine includes: throttle means; brake means; fuel pump means including a rack controller; and, an electronic control system including a central control unit for computing and generating a rack-travel nominal value signal $R_{nom\text{-}ccu}$ for supplying the same to the rack controller; the safety arrangement comprising:

first sensor means for providing an electrical signal N indicative of the rotational speed (rpm) of the engine;

second sensor means for providing an electrical signal $T_{n1}$ of the no-load or idle position of said throttle means;

third sensor means for providing an electrical signal BR indicative of the position of said brake means; and, a combinational logic circuit connected to said central control unit for receiving said rack-travel nominal value signal $R_{nom\text{-}ccu}$, said combinational logic circuit being further connected to each of said sensor means for receiving said signals N, $T_{n1}$ and BR;

said combinational logic circuit including: combining circuit means for combining said signals N, $T_{n1}$ and BR for forming a rack-travel value $RT_{min}$; and, minimum-value selection circuit means for receiving said $RT_{min}$ and said $RT_{nom\text{-}ccu}$ for comparing the same and providing a new corrected rack-travel nominal value $RT_{nom\text{-}cor}$ for said rack controller.

2. A safety arrangement for a self-igniting internal combustion engine such as a diesel engine or the like for a motor vehicle wherein the engine includes: throttle means; brake means; fuel pump means including a rack controller; and, an electronic control system including a central control unit for computing and generating a rack-travel nominal value signal $R_{nom\text{-}ccu}$ for supplying the same to the rack controller; the safety arrangement comprising:

first sensor means for providing an electrical signal N indicative of the rotational speed (rpm) of the engine;

second sensor means for providing an electrical signal $T_{n1}$ of the no-load or idle position of said throttle means;

third sensor means for providing an electrical signal BR indicative of the position of said brake means;

rpm comparator means for monitoring said rpm signal N and comparing the same to a lower limit value $N_{lim}$ for generating a signal ($N > N_{lim}$) indicative of the comparison; and, a combinational logic circuit connected to said central control unit for receiving said rack-travel nominal value signal $R_{nom\text{-}ccu}$ and said comparison signal ($N > N_{lim}$), said combinational logic circuit being further connected to said second sensor means and said third sensor means for receiving said signals $T_{n1}$ and BR, respectively;

said combinational logic circuit including: combining circuit means for combining said signals ($N > N_{lim}$), $T_{n1}$ and BR for forming a rack-travel value $RT_{min}$; and, minimum-value selection circuit means for receiving said $RT_{min}$ and said $R_{nom\text{-}ccu}$ for comparing the same and providing a corrected rack travel nominal value $RT_{nom\text{-}cor}$ for said rack controller.

3. A safety arrangement for a self-igniting internal combustion engine such as a diesel engine or the like for a motor vehicle wherein the engine includes: throttle means; brake means; fuel pump means including a rack controller having an output stage and an electrical shut-off valve (ELAB) for shutting off the fuel injection equipment; and, an electronic control system including a central control unit for computing and generating a rack-travel nominal value signal $R_{nom\text{-}ccu}$ for supplying the same to the rack controller; the safety arrangement comprising:

first sensor means for providing an electrical signal N indicative of the rotational speed (rpm) of the engine;

second sensor means for providing an electrical signal $T_{n1}$ of the no-load or idle position of said throttle means;

third sensor means for providing an electrical signal BR indicative of the position of said brake means;

fourth sensor means for providing an electrical signal RT indicative of rack travel;

rpm comparator means for monitoring said rpm signal N and comparing the same to a lower limit value $N_{min}$ and an upper limit value $N_{max}$ thereof and generating respective signals ($N > N_{min}$) and ($N > N_{max}$) indicative of said comparisons;

a combinational logic circuit connected to said central control unit for receiving said rack-travel nominal value signal $R_{nom\text{-}ccu}$, and said comparison signal ($N > N_{min}$), said combinational logic circuit being further connected to said second sensor means and said third sensor means for receiving said signals $T_{n1}$ and BR, respectively;

said combinational logic circuit including: combining circuit means for combining said signals ($N > N_{lim}$), $T_{n1}$ and BR for forming a rack travel value $RT_{min}$; and, minimum-value selection circuit means for receiving said $RT_{min}$ and said $R_{nom\text{-}ccu}$ for comparing the same and providing a new corrected rack-travel nominal value $RT_{nom\text{-}cor}$ for said rack controller;

first rack-travel comparator means for monitoring said signal RT from said fourth sensor means and comparing the same to said rack-travel nominal value $RT_{nom\text{-}cor}$ from said minimum-value selection means for generating signals [($RT < RT_{nom\text{-}cor}$) or ($RT > RT_{nom\text{-}cor}$)] indicative of a deviation in rack travel;

second rack-travel comparator means for monitoring said signal RT from said fourth sensor and comparing the same to an upper rack travel limit value $RT_{up}$ and a lower rack travel limit value $RT_{lo}$ and for determining if said signal is within a permissible range ($RT_{lo} > RT > RT_{up}$) or within impermissible ranges [($RT < RT_{lo}$) or ($RT > RT_{up}$)] and providing signals $RT_{per}$ or $RT_{imp}$, respectively, indicative thereof;

decision circuit means for monitoring the outputs of said first rack-travel comparator means and said second rack-travel comparator means and the output of said rpm comparator means corresponding to ($N > N_{min}$) and for providing a decision signal upon the simultaneous presence of the following: said rack-travel deviation signal [($RT < RT_{nom\text{-}cor}$) or ($RT > RT_{nom\text{-}cor}$)]; said signal $RT_{per}$; and said signal ($N > N_{min}$); and, shutoff means for responding to said decision signal and causing at least one of the following: interruption of the current of the output stage of said rack follower and actuating the electrical shutoff valve (ELAB) on the fuel pump.

4. The safety arrangement of claim 3, said shutoff means being connected to the output of said rpm comparator means corresponding to ($N>N_{max}$) for interrupting the current to the output stage of said rack follower when said signal ($N>N_{max}$) is detected.

5. The safety arrangement of claim 4 comprising: second decision circuit means for monitoring the output of said second rack-travel comparator means and for providing a second decision signal in response to said signal $RT_{imp}$; and, emergency mode means for responding to said second decision signal to permit an emergency mode of operation.

6. The safety arrangement of claim 5, said first-mentioned decision circuit means including a first AND-Gate for receiving said rack-deviation signal and said signal ($N>N_{min}$); time delay circuit means connected to the output of said first AND-Gate for delaying the output signal of said first AND-Gate; and a second AND-Gate also connected to said output of said first AND-Gate and to the output of said time delay circuit means; said second AND-Gate being further connected to said second rack-travel comparator means for receiving said signal $RT_{per}$; said second AND-Gate providing said first-mentioned decision signal upon the simultaneous presence of the following: said output signal of said first AND-Gate; the output signal of said time delay circuit means; and said signal $RT_{per}$; said upper and lower limit values $RT_{up}$ and $RT_{lo}$ being the upper and lower limit stops, respectively, determined by the characteristic of said fourth sensor means.

7. The safety arrangement of claim 3, said shutoff means being connected to the output of said rpm comparator means corresponding to ($N>N_{max}$) for responding to said signal ($N>N_{max}$) to interrupt the current to the output stage of said rack controller thereby causing said fourth sensor means to feedback a rack-travel signal to said first rack-travel comparator means that results in a rack-travel deviation which, in turn, causes said shutoff means to maintain the interruption of current to said output stage whereby an irreversible shutoff of the output stage occurs.

8. The safety arrangement of claim 3 comprising: a separate function block connected to the output of said rpm comparator means corresponding to ($N>N_{max}$) for responding to said signal ($N>N_{max}$) to interrupt the current to the output stage of said rack controller; said shutoff means responding to said decision signal for only actuating the electrical shutoff valve (ELAB) on the fuel pump.

9. The safety arrangement of claim 8 wherein the shutoff of said electrical shutoff valve is reversible at high rotational speeds and wherein said first rack-travel comparator means includes: ancillary circuit means for monitoring said signal ($N>N_{max}$) and inverting the same, said ancillary circuit means including means for blocking the action of said signal ($RT<RT_{nom-cor}$) whereby only said rack-travel deviation signal ($RT>RT_{nom-cor}$) coacts with said signal $RT_{per}$ and said signal ($N>N_{min}$) to form said decision signal.

10. The safety arrangement of claim 9, said combining circuit means including ancillary means for monitoring the output of said rpm comparator means corresponding to ($N>N_{max}$) for responding thereto by forming said rack-travel value $RT_{min}$.

* * * * *

UNITED STATES PATENT AND TRADEMARK OFFICE
CERTIFICATE OF CORRECTION

PATENT NO. : 4,515,125
DATED : May 7, 1985
INVENTOR(S) : Rainer Buck et al

It is certified that error appears in the above-identified patent and that said Letters Patent is hereby corrected as shown below:

In column 7, line 36: delete "$Nhd_{max}$" and substitute -- $N_{max}$ -- therefor.

In column 10, line 27: delete "$N_{min}$" and substitute -- $N_{lim}$ -- therefor.

In column 10, line 64: delete "$N_{min}$" and substitute -- $N_{lim}$ -- therefor.

In column 10, line 68: delete "$N_{min}$" and substitute -- $N_{lim}$ -- therefor.

In column 11, line 21: delete "$N_{min}$" and substitute -- $N_{lim}$ -- therefor.

In column 12, line 29: delete "$N_{min}$" and substitute -- $N_{lim}$ -- therefor.

Signed and Sealed this

Tenth Day of June 1986

[SEAL]

Attest:

DONALD J. QUIGG

Attesting Officer

Commissioner of Patents and Trademarks

UNITED STATES PATENT AND TRADEMARK OFFICE
CERTIFICATE OF CORRECTION

PATENT NO. : 4,515,125

DATED : May 7, 1985

INVENTOR(S) : Rainer Buck et al

It is certified that error appears in the above-identified patent and that said Letters Patent is hereby corrected as shown below:

In column 10, line 26: delete "$N_{min}$" and substitute -- $N_{lim}$ -- therefor.

In column 10, line 32: delete "$N_{min}$" and substitute -- $N_{lim}$ -- therefor.

Signed and Sealed this

Twenty-first Day of October, 1986

[SEAL]

Attest:

DONALD J. QUIGG

Attesting Officer

Commissioner of Patents and Trademarks